Jan. 11, 1927.
S. A. S. HAMMAR
1,613,702
GEAR TOOTH
Original Filed May 20, 1920    2 Sheets-Sheet 1
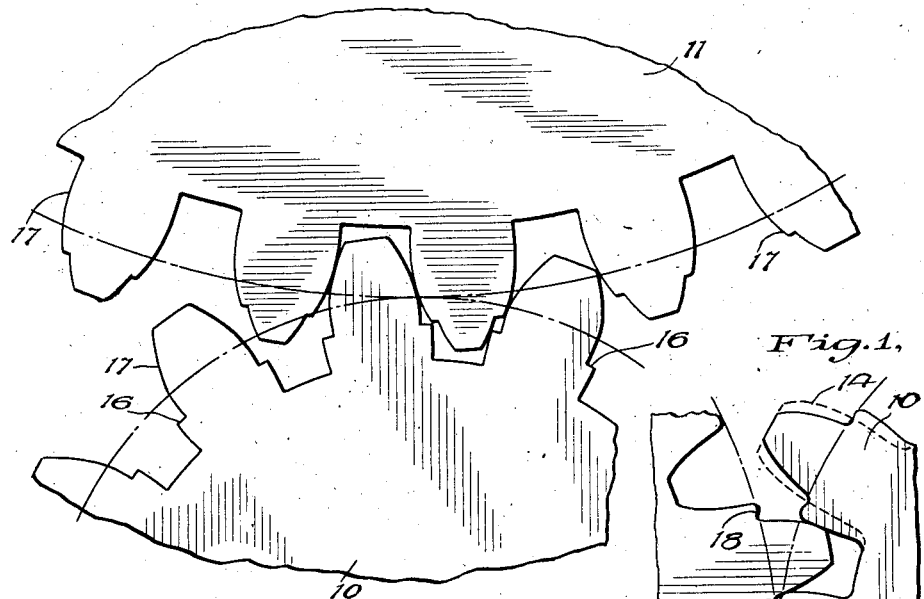
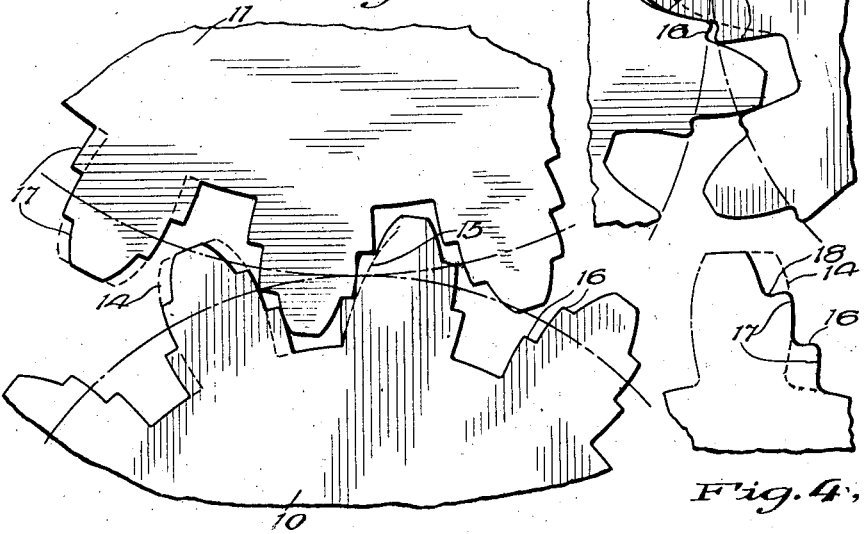
WITNESSES
INVENTOR
Sigard A. S. Hammar
BY Munn & Co.
ATTORNEYS Jan. 11, 1927. 1,613,702
S. A. S. HAMMAR
GEAR TOOTH
Original Filed May 20, 1920  2 Sheets-Sheet 2
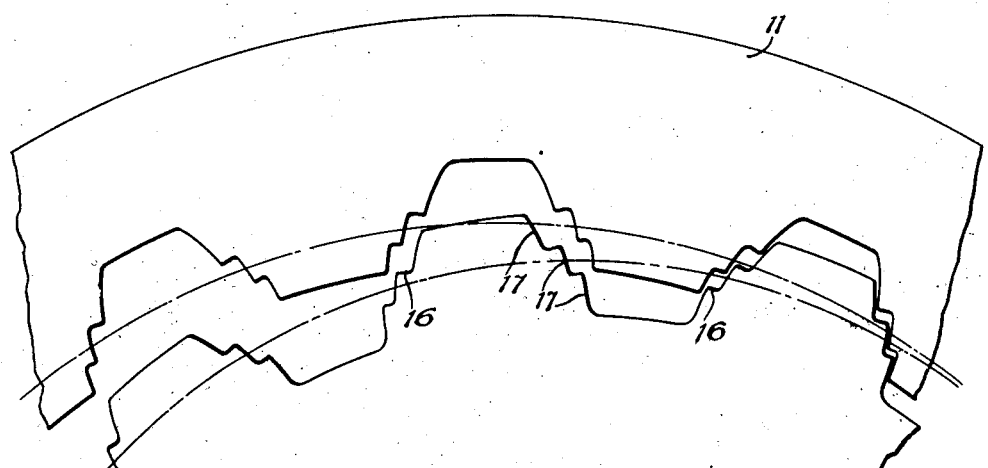
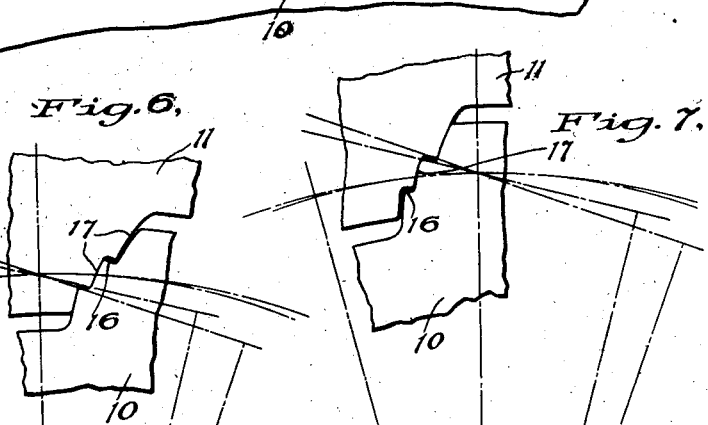
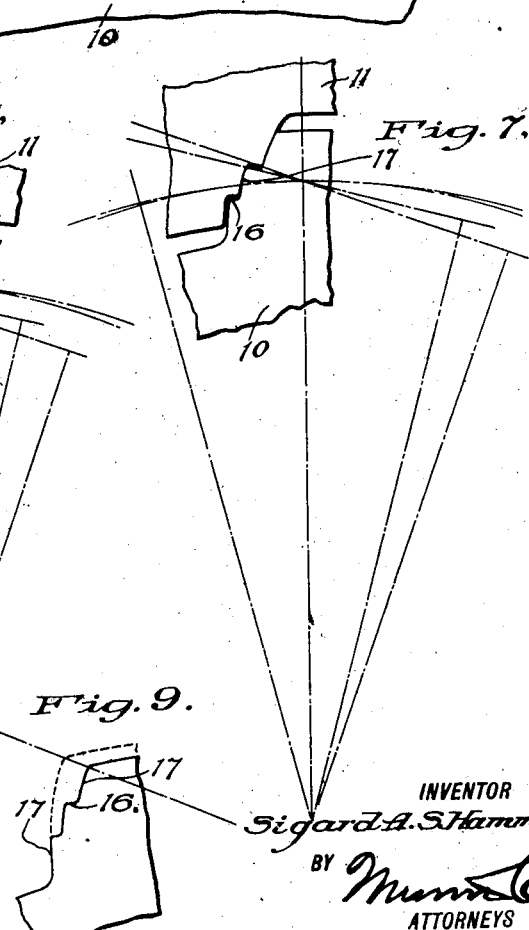
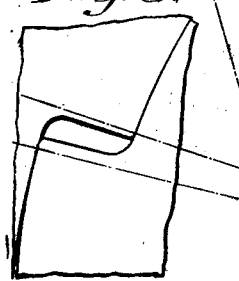
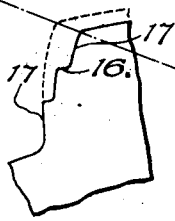
INVENTOR
Sigard A. S. Hammar
BY
ATTORNEYS Patented Jan. 11, 1927.

1,613,702

UNITED STATES PATENT OFFICE.

SIGARD A. S. HAMMAR, OF BETHLEHEM, PENNSYLVANIA.

GEAR TOOTH.

Continuation of application Serial No. 382,907, filed May 20, 1920. This application filed June 15, 1922. Serial No. 568,502.

This invention relates to gear teeth and has reference more particularly to gear teeth stepped to increase their strength and to accomplish improvements which will be explained in this specification and is a continuation of my application Serial No. 382,907, filed May 20, 1920, entitled Gear teeth.

In the construction of gears to accomplish certain work difficulty has often been experienced in providing gear teeth of the necessary strength. Engineers have devoted much time to this problem in efforts to obtain gear wheels of a certain size and weight which give the desired strength. The weakest point of gear teeth of the usual construction is at the base and in order to provide gear teeth having a maximum strength attention must be directed to the strengthening of the gear teeth at the base. It was to solve this problem that the invention to be described in the following specification was devised.

The formula for the strength of a cantilever beam is as follows:

$$P = \frac{Sft^2}{6l} \quad\quad\quad\quad\quad 1$$

where $f$ is the width of the beam, $t$ is the thickness of the beam at the support, $l$ is the length of the beam extending beyond the support, S is the maximum allowable stress, P is the load which, if applied to the end of the beam, will produce the stress S.

This formula may be applied to the strength of gear teeth, and it is evident from inspection of the formula that gear teeth may be strengthened (1) by increasing the face of the tooth or ($f$); (2) by reducing the length of the tooth ($l$); and (3) by increasing the thickness of the tooth ($t$). The face of the tooth may be increased within certain limits, but the weight of the gear is likewise increased in the same proportion as the strength. The length of the tooth can also be decreased only to a certain limit. The thickness ($t$) at the root is governed by the thickness at the pitch circle, which is limited to one-half the pitch in the case of teeth of the present standard construction. To increase the thickness is therefore equivalent to increasing the pitch, and assuming that the teeth of this new pitch are of the same shape as the teeth of the old pitch, and the new gear of the same shape as the old gear, it is easily shown that the increase in strength, as measured by the maximum allowable bending moment, is accompanied by increase in weight in more than direct proportion.

The aforementioned formula can be written as follows:

$$l = \frac{Sft^2}{6P} \quad\quad\quad\quad\quad 2$$

which assuming that S, $f$, and P are constant, may be written $$l = Kt^2 \quad\quad\quad\quad\quad 3$$

Equation 3 resembles the typical formula for a parabola;

$$2px = y^2 \quad\quad\quad\quad\quad 4$$

or $$x = Ky^2 \quad\quad\quad\quad\quad 5$$

Thus it is seen that in order to make a gear tooth of uniform strength throughout its length, the tooth must have a parabolic outline. However, a tooth with a parabolic outline would not have the requisite characteristics of a gear tooth which is to give a constant speed with the minimum of friction.

The general object of this invention is the provision of gear teeth which approach uniformity of strength throughout.

This object is accomplished by making a gear tooth in the form of steps in which metal is removed from the end of the gear tooth and metal added at its base so that the thickness at the base is increased and the thickness of the tooth at the successive steps is the same as the thickness at corresponding points of a beam of parabolic outline, or approaches this condition more nearly than does an unstepped tooth.

As will be shown hereafter a stepped tooth is not only thicker at the root for a given pitch but it is also shorter for a given angle of contact, and as the strength of a tooth is proportional to the square of its thickness and inversely proportional to its length it can be seen that the increase in strength to be realized by stepping a tooth is very great.

An advantage which I claim for the stepped tooth is greater angle of contact for a given length of tooth. The angle of contact of a tooth is that angle through which a gear rotates while the tooth is in contact. For an unstepped involute tooth for instance, this angle is equal to the angle subtended by the line of action plus the angle subtended by the involute curvature of the tooth. For a stepped tooth the angle of contact equals the sum of the angles of contact of the composing sections, or, in other words, the angle of contact of the stepped tooth equals the angle of contact of the unstepped tooth plus the sum of the angles subtended by the steps or shoulders on one side of the tooth. The greater angle of contact is particularly valuable when the number of teeth is very small. If an increased angle of contact is not required, the teeth may be made shorter, thus adding to the strength of the tooth and reducing friction, which is greater for long teeth than for short teeth, as portions of a tooth lying farther from the pitch circle slip more than parts lying nearer the same.

A third point in favor of the stepped tooth is that gears, having teeth of this description for a given horsepower to be transmitted, may be considerably smaller than gears having unstepped teeth. This means not only saving in first cost and in the space occupied, but also, owing to reduced circumferential velocity, less noise in operation and reduced stresses in the metal of the teeth.

Since a gear with stepped teeth, in transmitting a given horsepower, will be smaller and run at a lower peripheral velocity than a gear with unstepped teeth, and there is a limit to the peripheral speed at which a gear may be run, it follows that the maximum power which can be transmitted by stepped teeth is greater than the maximum power which can be transmitted by unstepped teeth.

When used on internal gears the superiority of stepped teeth is very striking. As each section of a stepped tooth is shorter than a whole tooth, it follows that the sections will clear after disengagement more readily than will the whole tooth when it is unstepped. Therefore the pinion may, for a given pitch and length of tooth, be made much larger in proportion to the gear and, by introducing a sufficient number of steps, the gear and pinion may differ by as little as one tooth, and yet the pitch, length of tooth, number of teeth, angle of contact, etc., be anything desired. It is evident that by this means the greatest powers may be transmitted and, when used in differential action, one pair of gears, and these smaller than the first pair of gears in a train of gears of the usual form, be made to do the service of the whole gear train, resulting in simpler construction and the almost complete elimination of friction, wear and noise. Where the teeth are oblique as are worm threads, spiral teeth, etc., more than one section of the stepped tooth are in contact at the same time. This will distribute the load and not only reduce the bending moment but also greatly reduce the wear of the teeth.

I am aware that variable motion has been obtained by using gears having various series of teeth, each series with its own tooth characteristics such as pitch circle, addendum and dedendum as shown in Patent No. 466,923 to Price. However, in the Price patent the object is to obtain a variable motion between the shafts which is obtained by making each tooth in each series complete in itself.

Reference is to be had to the accompanying drawing forming a part of this specification in which it is understood that the drawing illustrates only one form of the invention with certain modifications, and in which Figure 1 is a fragmentary elevation of my improved gear teeth;

Figure 2 is a fragmentary elevation of a modified form of my improved gear teeth;

Figure 3 is a fragmentary elevation of a second modified form of my gear teeth;

Figure 4 is a fragmentary elevation of a modification showing a tooth which has steps on one side only;

Figure 5 is a fragmentary elevation of an internal gear of fourteen teeth meshing with a pinion of twelve teeth;

Figure 6 is a drawing of one of the teeth of the same pinion at the point of rotation where the first and second section of a tooth are in contact at the same time;

Figure 7 is a view showing the second and third sections of a tooth in contact at the same time;

Figure 8 is an enlarged view showing the second and third sections of a tooth in contact at the same time;

Figure 9 is a view showing a stepped tooth in full lines and an unstepped tooth in dotted lines, both having the same angle of contact and also showing the line of action.

Referring to the above-mentioned drawings, a pinion 10 and a gear 11 are shown. Gear teeth of ordinary construction will have the shape shown by the dotted lines 14 in Figures 1, 3 and 4, and with this shape the weakest part of the tooth is at the base. Theoretically as pointed out previously in the specification, a tooth having a uniform strength throughout its length would be parabolic in outline as shown by the dotted lines 15 in Figures 1 and 3. In order to strengthen the base of the tooth, I remove metal from the end of the tooth where the tooth is strongest, and add metal at the base of the tooth so as to form one or more steps or shoulders 16. In this manner and by correctly dimensioning the steps, I form a tooth of two or more stepped portions or sections 17, the thickness at the base of each portion being approximately a double ordinate of a parabola whose vertex lies in that point on the center line of the tooth in which the load may be considered applied when the end of the tooth is engaged. In the modification shown in Figure 4, one side of the tooth has the unstepped outline of a standard gear tooth while the opposite side is stepped. The steps are twice as great as when both sides are stepped and the strength is the same.

This is an important construction of gears, which run always in the same direction, as in this matter, making the stepped side the working side the increase in the angle of contact is twice as great as when both sides are stepped. If the unstepped side is the working side it is not necessary to provide for continuous contact.

Referring to Figures 5, 6 and 7, an internal gear 11 and a pinion 10 are shown with stepped teeth formed thereon. The shoulders 16 and the sections 17 are formed in the same manner as described in the preceding paragraphs.

It is a well known fact that in order to cause gear teeth to transmit a perfectly uniform motion, the normal to the tooth surfaces at the point of contact must always pass through the point of tangency of the pitch circles of the gear and pinion. In order to accomplish this, I so shape the contact surfaces on the successive stepped portions or sections 17, that the aforementioned conditions are fulfilled and a perfectly uniform motion will be transmitted by the gear teeth. In other words, each of the stepped portions on the tooth are constructed with reference to a common pitch circle so as to obtain a uniform speed with a minimum of friction, while in the patent to Price, each series of teeth is constructed with reference to its own individual pitch circle so that a variable speed is obtained. It is clear that as long as the sections of a tooth have a common pitch circle, it is not necessary that the contours of the sections should all conform to the same mathematical curve.

In Figures 1, 4, 5 and 7 is shown at the junction of stepped portion 17 with the shoulder 16, a fillet serving to strengthen the outer end of the tooth. It will be seen, that while the shoulder is not undercut with reference to the line of action, which would be undesirable, it is undercut with respect to the center of the gear, that is, a radial line drawn to the outer point of the shoulder is longer than a radial line drawn to the inner corner or sinus of the same.

In the form shown in Figure 3, two shoulders 16 are formed on the teeth so as to form three stepped portions on each side of the tooth, the contact surfaces being shaped substantially according to the aforementioned rule. It is understood that my teeth may be made involute, cycloidal or by any other desired system, and different sections of the same tooth may conform to different systems.

The gears shown in Figure 5 have teeth of three sections intercepted by two steps. Beginning at the root of the pinion tooth, the first section is a 20 degree involute, the second section a 15 degree involute. Figure 6 shows a point in the rotation of the gears, where both these sections are in contact. As the step is inside the pitch circle, the 20 degree line of action lies inside the 15 degree line of action. Therefore, if the first section is a 20 degree involute and the second section a 15 degree involute, there is an angle of 5 degrees between the lines of action of the two sections and a corresponding clearance space between the shoulder of the pinion and the shoulder of the gear. This space may be utilized so, that the second section engages before the first section disengages without undercutting either shoulder of the engaging teeth with reference to its line of action. If the arrangement were reversed and the first section were a 15 degree involute and the second section a 20 degree involute, the step lying inside the pitch circle, or if both sections were 20 degree involutes it would be necessary to undercut the shoulders or the contact would not be continuous.

The second step lies outside the pitch circle. Therefore the 20 degree line of action lies outside the 15 degree line of action and, if we make the third section a 20 degree involute, we have a space as before subtending 5 degrees at the pitch point and can make the contacts of the two sections overlap without undercutting with reference to the lines of action. The point in the rotation of the gears where sections 2 and 3 are in contact at the same time are shown on an enlarged scale in Figure 7. It will be understood that teeth thus constructed will have a common pitch circle and two base circles.

In the great majority of cases it is not necessary to make provision for continuity of contact from one section to the next of the same tooth, or to make the shoulder of any specific outline. All spiral and helical gears are exempt from this necessity, as are also all spur and bevel gears, whose angle of contact exceeds the pitch angle, that is, the angle subtended by one tooth and space, sufficiently to allow the preceding or succeeding tooth to be engaged while the step is being passed. For instance, if we have a 16-tooth 20 degree involute stepped pinion and the engagement with the gear commences in the point where the line of action is tangent to the base circle, the angle of contact being 38 degrees, then, if the first step crosses the line of action within 15½ degrees of the said tangent point, the preceding tooth will be still engaged, and if the second step passes the line of action after the tooth has been in contact 22½ degrees, the following tooth will have entered into engagement. Such a location of the steps would be very satisfactory, but, if for the same angle of contact, we had a pinion of 10 teeth, it is evident that the steps would have to be located too near to the root and top of the tooth, unless provision were made whereby each section remained in contact until the following section had become engaged.

It is evident that the advantages inherent in stepped teeth apply to all gears internal or external, including spur gears, bevel gears, worms and worm gears, spiral gears, helical gears, etc.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims. While it is desirable that the steps should be so arranged that the teeth of two meshing gears are equally strong and the strength of the teeth the maximum which can be realized with a given number of steps, it is often preferable to modify the teeth. So, for instance, the steps may be made larger in order to realize a greater angle of contact or smaller for the purpose of modifying the contour of the shoulder or they may be made either smaller or larger for the sake of meshing with the teeth of other gears or for the purposes of interchangeability and standardization.

Thus, if the gears are standardized and the smallest gear of a certain standard set has teeth whose sections follow the geometric progression of the true parabola, none of the larger gears of the same set can follow the same progression exactly. Furthermore, there are other advantages to be derived from the invention besides increase in strength and in endeavoring to realize these to the fullest extent it may be necessary to modify the thickness of the tooth sections. As regards strength the object of the invention is fulfilled when every section of the teeth of two engaging gears will carry a greater load than the weaker tooth of two engaging gears, which are unstepped.

Claims:

1. Gears having teeth consisting of a series of steps constructed so that the base of the tooth is made thicker due to the steps than an unstepped tooth of the same pitch and proportion, said steps being adapted to increase the strength of the tooth, the contact faces of the successive sections being constructed substantially with reference to a common pitch circle so that said gears run at a uniform speed with a minimum of friction.

2. Gear teeth constructed with a series of steps and sections, the thickness of each section being such that the various sections are equally strained when the load is applied at or near the point of the tooth, the contact surfaces of each tooth being constructed substantially with reference to a common pitch circle.

3. Gear teeth constructed with steps, the contact faces of each section being formed substantially with reference to a common pitch circle so that said gears run with a uniform speed and a minimum of friction, the steps being so proportioned that all sections are strained equally when a load is applied at the end of the tooth, and the bending moment is maximum.

4. Gear teeth in steps, the curvature of each stepped portion being substantially the same as the curvature of that part of a corresponding unstepped tooth which is in the same relative position with reference to the pitch circle.

5. Stepped gear teeth, the working faces of the successive step sections having substantially the same curvature as the corresponding successive elements of an unstepped tooth.

6. A gear having stepped teeth, the successive stepped sections being formed by curved lines, the curvature of each portion being governed by its position relatively to one common pitch circle.

7. A gear having stepped teeth with the points of maximum stress at the base of the successive steps on or near a parabola whose vertex lies approximately at the most extreme point where the maximum load may be applied.

8. Gears having stepped teeth, each step section joining the shoulder in a fillet which is sunk below the shoulder.

9. In gears, stepped gear teeth, the curvature of the successive stepped sections on both sides being the same as the curvature of the corresponding portions of an unstepped tooth.

10. In gears, stepped gear teeth, the working surface of the teeth consisting of successive sections whose contours are lines designed to make the gear rotate with uniform velocity.

11. In gears, stepped gear teeth, each face made up of two or more sections, the working surfaces of said sections consisting of lines of such nature that the contact passes from one section to the next without interruption.

12. In gears, stepped gear teeth, each working face of said gear teeth consisting of two or more sections, at least two of which sections make continuous contact.

13. Gear teeth having stepped faces, each working face of said gear teeth consisting of two or more sections, one or more of the shoulders between said sections being undercut with reference to the center of the gear.

14. Stepped gear teeth, each working face consisting of a plurality of sections, the sections being so arranged that when a shoulder between two sections is intersected by the line of action, the section of a tooth other than that to which the shoulder belongs is in contact.

15. Gears, having stepped teeth, the sections being constructed with reference to a common pitch circle but having more than one base circle.

SIGARD A. S. HAMMAR.